(12) United States Patent
Jurova

(10) Patent No.: US 7,571,236 B2
(45) Date of Patent: Aug. 4, 2009

(54) SYSTEM AND METHOD FOR MANAGING CONNECTIONS

(75) Inventor: Maria Jurova, Sofia (BG)

(73) Assignee: SAP AG, Walldorf (DE)

( * ) Notice: Subject to any disclaimer, the term of this patent is extended or adjusted under 35 U.S.C. 154(b) by 1152 days.

(21) Appl. No.: 10/863,020

(22) Filed: Jun. 7, 2004

(65) Prior Publication Data
US 2006/0047755 A1    Mar. 2, 2006

(51) Int. Cl.
G06F 15/16    (2006.01)
(52) U.S. Cl. .................. 709/228; 709/203; 709/220; 709/223; 709/225; 709/227; 709/229
(58) Field of Classification Search ............. 709/202, 709/203, 217, 227–229, 220, 223–225
See application file for complete search history.

(56) References Cited

U.S. PATENT DOCUMENTS

| | | | | |
|---|---|---|---|---|
| 5,928,323 A * | 7/1999 | Gosling et al. | ............. | 709/217 |
| 6,098,093 A * | 8/2000 | Bayeh et al. | ............. | 709/203 |
| 6,633,914 B1 * | 10/2003 | Bayeh et al. | ............. | 709/202 |
| 6,813,641 B2 * | 11/2004 | Fomenko et al. | ............. | 709/217 |
| 6,892,240 B1 * | 5/2005 | Nakajima | ............. | 709/227 |
| 6,973,480 B2 * | 12/2005 | Karim | ............. | 709/203 |
| 7,216,172 B2 * | 5/2007 | Yang et al. | ............. | 709/227 |
| 2004/0078474 A1 * | 4/2004 | Ramaswamy | ............. | 709/229 |
| 2005/0066327 A1 * | 3/2005 | Dettinger et al. | ............. | 718/100 |
| 2006/0047755 A1 * | 3/2006 | Jurova | ............. | 709/206 |
| 2006/0167883 A1 * | 7/2006 | Boukobza | ............. | 707/10 |

* cited by examiner

Primary Examiner—Ramy Osman
(74) Attorney, Agent, or Firm—Schwegman, Lundberg & Woessner, P.A.

(57) ABSTRACT

Embodiments of the invention are generally directed to a system and method for managing connections. A filter may receive a client request message having one or more parameters. In an embodiment, the filter may modify the request message based, at least in part, on the one or more parameters. The modified request message may indicate that a connection to the client is to remain open after a corresponding response message is sent. In an embodiment, the modified request message is passed to an application for processing.

23 Claims, 8 Drawing Sheets

SYSTEM AND METHOD FOR MANAGING CONNECTIONS

TECHNICAL FIELD

Embodiments of the invention generally relate to the field of data processing systems and, more particularly, to a system and method for managing connections.

BACKGROUND

Many businesses are providing access to their products and services through applications that are delivered over computer networks such as the Internet. These applications typically have a multi-tiered architecture. In those cases where the applications are delivered over the Internet they are commonly referred to as Web applications. FIG. 1 is a block diagram of a Web application 100 having a multi-tiered architecture.

Web application 100 includes client layer 110, application layer 120, and database layer 130. Client layer 110 includes user interface 112 that runs on a client computing device such as a desktop computer, a laptop computer, a personal digital assistant, a telephone, and the like. In a Web-based environment, user interface 112 is typically a Web browser. User interface 112 may collect input from a user and provide that input to application layer 120 for processing.

Application layer 120 includes application server 122 to receive and process input from client layer 110. Application server 122 typically includes a number of subcomponents including, for example, connectivity layer 140, presentation logic 142, business logic 144, and database interface 146. Connectivity layer 140 provides connections to client layer 110 using protocols such as the HyperText Transfer Protocol (HTTP). The HTTP protocol refers to any of the HTTP protocols including, for example, the protocol described in Request For Comments (RFC) 2616 entitled, "HyperText Transport Protocol—HTTP/1.1," June 1999 (hereinafter, the HTTP protocol). Presentation logic 142 generates a Graphical User Interface (GUI) using, for example, a markup language such as the Hyper Text Markup Language (HTML). Business logic 144 represents the core of the application, for example, the rules governing the underlying business process (or other functionality) provided by the application. Database interface layer 146 provides an interface to database layer 130. The Java 2 Enterprise Edition Specification v1.3, published on Jul. 27, 2001 (the J2EE Standard) defines an increasingly popular architecture for application layer 120.

Database layer 130 includes data access logic used by business logic 144 to store and retrieve data in database 132. Database 132 provides non-volatile storage (sometimes referred to as a persistent store) for the data accessed and/or processed by application layer 120. Database 132 may be, for example, a relational database or an object-oriented database.

In a Web-based environment, presentation logic 142 may be provided by a Web component such as a servlet. A servlet refers to a server-side Web component that interacts with a client through a request/response protocol. For example, the servlet may receive a request message, perform some processing, and return a response message to the client. A servlet processes a request message using a service method. Typically, the request/response messages are implemented according to one of the HTTP protocols.

In conventional Web applications, the connection to a client is automatically closed when the servlet exits its service method and the response message is sent to the client. Also, conventional Web applications release the message processing resources (e.g., finalize request/response objects) after the response message is sent to the client. Thus, in conventional Web applications, the client is no longer accessible after the response message is sent.

SUMMARY OF THE INVENTION

Embodiments of the invention are generally directed to a system and method for managing connections. A filter may receive a client request message having one or more parameters. In an embodiment, the filter may modify the request message based, at least in part, on the one or more parameters. The modified request message may indicate that a connection to the client is to remain open after a corresponding response message is sent. In an embodiment, the modified request message is passed to an application for processing.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments of the invention are generally directed to a system and method for managing connections. A filter may receive a client request message having one or more parameters. In an embodiment, the filter may modify the request message based, at least in part, on the one or more parameters. The modified request message may indicate that a connection to the client is to remain open after a corresponding response message is sent. As is further described below, the modified request message may be passed to an application for processing.

Figure 1:
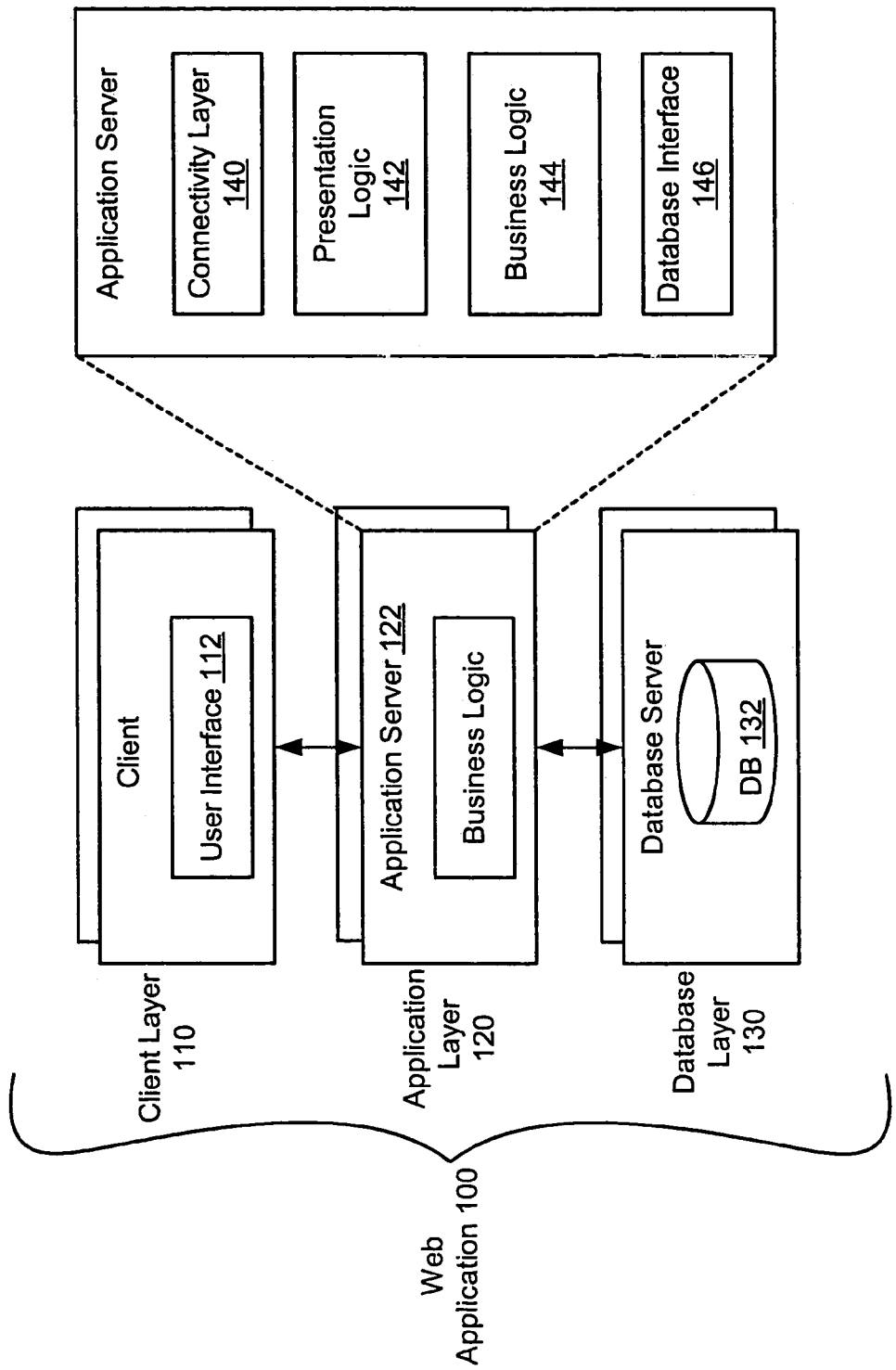
FIG. 1 is a block diagram of a Web application having a multi-tiered architecture.
Figure 2:
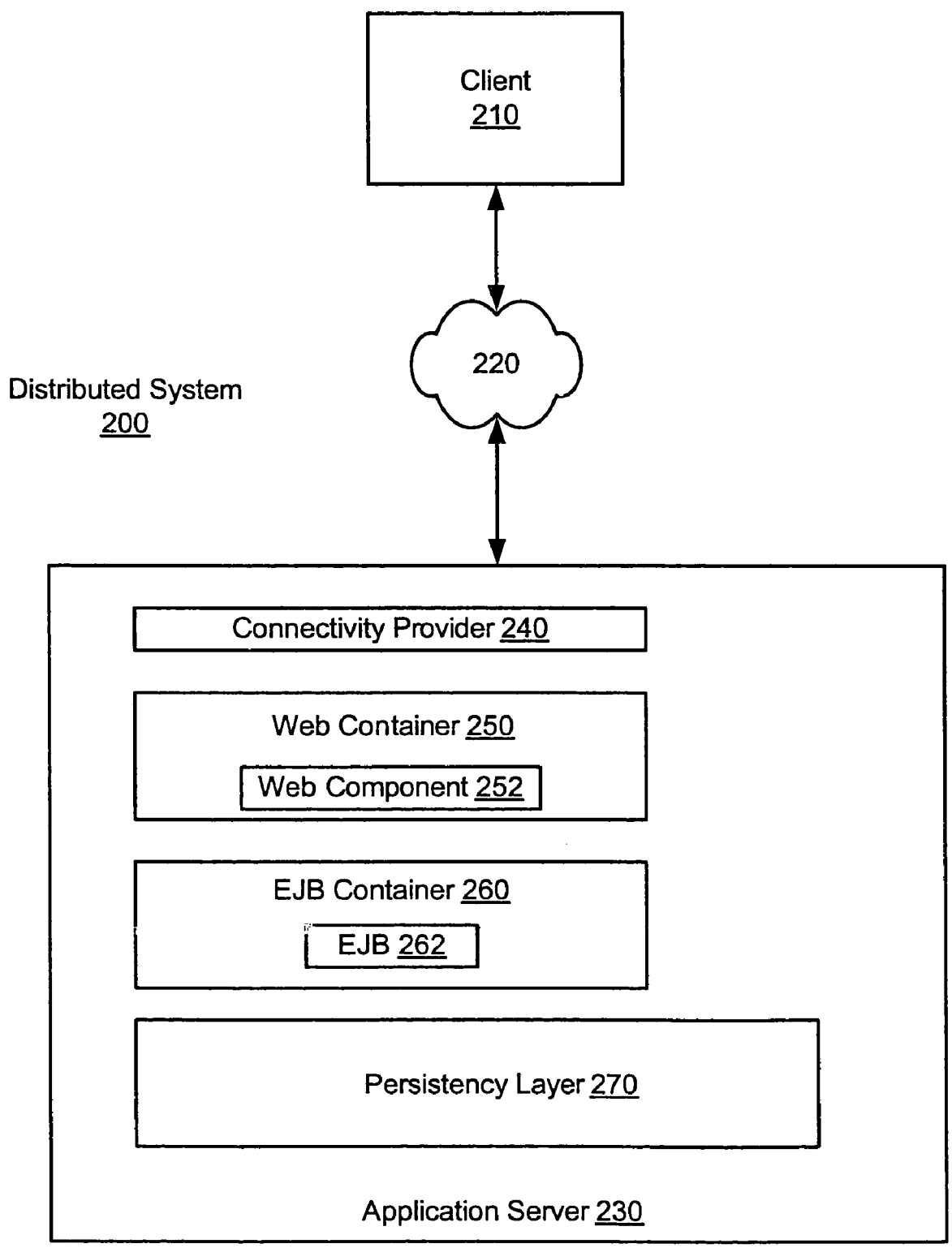
FIG. 2 is a block diagram of selected elements of a distributed system implemented according to an embodiment of the invention.

FIG. 2 is a block diagram of selected elements of distributed system 200 implemented according to an embodiment of the invention. In an embodiment, distributed system 200 may be part of a multi-tiered network. The multi-tiered network may be implemented using a variety of different application technologies at each of the layers of the multi-tier architecture, including those based on the Java 2 Enterprise Edition™ ("J2EE") platform, the Microsoft .NET platform, the Websphere platform developed by IBM Corporation, and/or the Advanced Business Application Programming ("ABAP") platform developed by SAP AG. The illustrated embodiment of distributed system 200 includes client 210, network 220, and application server 230.

Client 210 provides request messages to (and receives response messages from) application server 230 over, for example, network 220. Client 210 may be, for example, a personal computer, a laptop computer, a personal digital assistant, a telephone, another application server, and the like. In one embodiment, client 210 provides request messages that are based, at least in part, on the HTTP protocol. Network 220 may be, for example, any combination of a wired or wireless Local Area Network (LAN), Wide Area Network (WAN), Metropolitan Area Network (MAN), intranet, and/or the Internet.

Application server 230 receives the request message from client 210 and may generate a response message after processing the request message. In an embodiment, application server 230 is based, at least in part, on the J2EE standard. In an alternative embodiment, application server 230 may be based on a different platform such as Microsoft Corporation's .Net platform or IBM's Websphere platform. The illustrated embodiment of application server 230 includes connectivity provider 240, Web container 250, Enterprise Java Bean container 260, and persistency layer 270. In an alternative embodiment, application server 230 may include more elements, fewer elements, and/or different elements.

In an embodiment, connectivity provider 240 provides the low-level communication service that enables Web container 250 to exchange request/response messages with client 210. In one embodiment, connectivity provider 240 implements, at least in part, the HTTP protocol. Connectivity provider 240 may receive request messages having Uniform Resource Identifiers (URIs) that map to a given server/port combination. Connectivity provider 240 may parse the received request message to determine which resource (e.g., which application) is invoked by the request.

In an embodiment, the invoked resource includes Web component 252 of Web container 250. The term Web component broadly refers to server-side software that extends the functionality of application server 230. Web component 252 may be, for example, a servlet, a Java Server Page (JSP), a portlet, and the like. In an embodiment, Web container 250 provides one or more services to Web component 252. The services provided by Web container 250 may include, for example, lifecycle management, security, connectivity, transactions, and/or persistence.

In an embodiment, Web container 250 receives a request message from connectivity provider 240 and parses it to determine which Web component is invoked by the request. In one embodiment, the request message is modified to indicate that a connection to the client is to remain open after a corresponding response message is sent to client 210. Similarly, the request message may be modified to indicate that the request message is to be maintained (e.g., in memory) after the corresponding response message is sent to client 210. Modifying the request message is further discussed below with reference to FIGS. 3-9.

The modified request message is passed to Web component 252 for processing. In an embodiment, Web component 252 may, for example, access static HTML content or generate dynamic HTML content to generate a response message. In addition, Web component 252 may access business logic to process the modified request message. For example, in a J2EE environment, Web component 252 may invoke one or more methods of Enterprise Java Bean (EJB) 262 to process a request message. EJB 262 is a server-side component that encapsulates business logic and/or represents persistently stored data. In such an embodiment, EJB container 260 may provide one or more services to EJB 262 such as lifecycle management, security, connectivity, transactions, and/or persistence. In an embodiment, persistency layer 270 provides Web component 252 with access to a persistent store.

Figure 3:
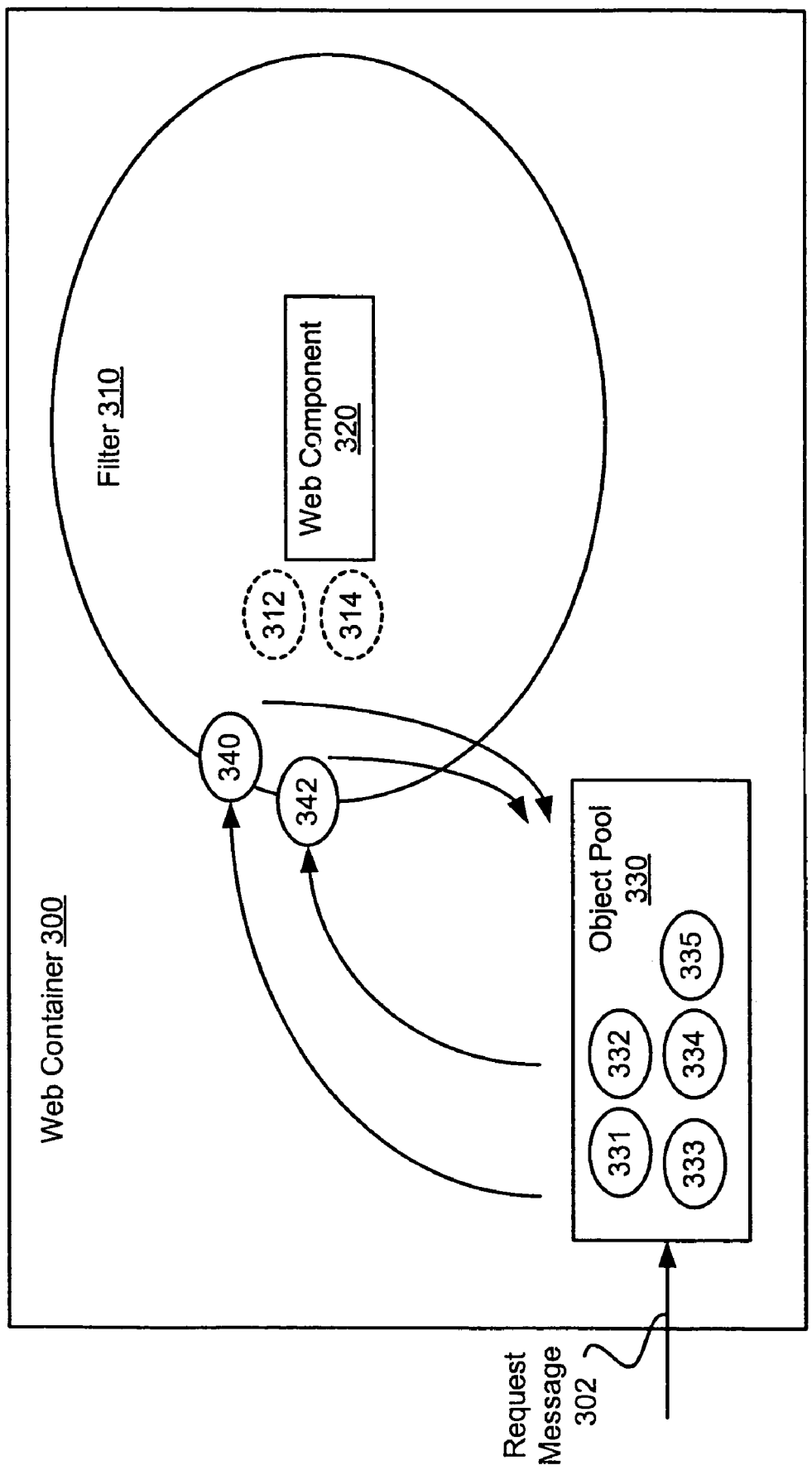
FIG. 3 is a block diagram of selected elements of a Web container, implemented according to an embodiment of the invention.

FIG. 3 is a block diagram of selected elements of Web container 300, implemented according to an embodiment of the invention. The illustrated embodiment of Web container 300 includes filter 310, Web component 320, and request/response object pool 330. In alternative embodiments, Web container 300 may include more elements, fewer elements, and/or different elements.

Filter 310 is a class that wraps itself around Web component 320 and intercepts inbound request messages (and/or outbound response messages). Filter 310 may perform various pre and/or post processing on the intercepted request/response message. As is further discussed below, in one embodiment, filter 310 modifies inbound request messages to indicate that a connection to the client is to be maintained after the corresponding portion of a response message is sent. Typically, Web component 320 writes only a portion of a response message. For ease of discussion, the term "response message" may refer to that portion of a response message that is written by a Web component (e.g., Web component 320).

Web container 300 receives request message 302 from, for example, connectivity provider 240, shown in FIG. 2. Web container 300 parses request message 302 to determine which Web component to invoke and also to obtain one or more parameters (e.g., input parameters such as a URI that specifies a requested resource). In one embodiment, Web container 300 maintains a pool of request/response objects 331-335. Each request/response object may include methods that Web component 320 may use to manipulate the object. In such an embodiment, Web container 300 may initialize a pair of request/response objects with the parameters obtained from the request message. The initialized request/response objects may then be passed to filter 310.

Various properties of Web container 300 and the applications deployed to it may be described in one or more descriptor files. The descriptor files may be written in a markup language (e.g., the extensible Markup Language (XML)) to ensure portability of the files. A globally accessible descriptor file may define initial settings that may be relevant to all Web applications running within Web container 300. This globally accessible file may be used to declare the availability of various filters, application components, etc. For example, the global file may declare the availability of filter 310. Listing 1 illustrates one example of declaring filter 310 in a globally accessible file for Web container 300.

Listing 1

```
<filter>
    <filter-name>Filter310</filter-name>
    <filter-class >Name of the package containing
    the filter class(es) </filter-class >
</filter>
```

In addition to the globally accessible file, in one embodiment, each Web application has an associated descriptor file (e.g., a J2EE deployment descriptor). The availability of Web component 320 may be declared in this application specific descriptor (often referred to as a Web.xml file) file. In an embodiment, filter 310 is applied to Web component 320 by providing an appropriate filter mapping for filter 310 in Web component 320's descriptor file. Listing 2 illustrates one example of specifying that filter 310 maps to Web component 320.

Listing 2

```
<filter-mapping>
    <filter-name>Filter310</filter-name>
    <url-pattern>/WebComponent320 </url-pattern >
</filter-mapping >
```

Filter 310 receives request/response objects 340-342 from Web container 300. In one embodiment, Filter 310 generates modified request/response objects 312-314 by copying the parameters from request/response objects 340-342 into modified request/response objects 312-314. The original request/response objects 340-342 may then be returned to object pool 330. Thus, the resources used by Web container 300 to process HTTP request message 302 (e.g., HTTP threads and request/response objects 340-342) are available to process another inbound HTTP request message.

In one embodiment, modified request/response objects 312-314 include an indication that the response stream to the client is to be maintained (rather than automatically closed) after the response message is sent to the client. Similarly, in an embodiment, modified request/response objects 312-314 may include an indication that they are to be maintained (e.g., in memory) rather than finalized (as per the J2EE specification) after the response message is sent. In one embodiment, the "indication" provided by modified request/response objects 312-314 is one or more flags set to indicate, for example, that a connection to the client is to be maintained after the response message is sent. In alternative embodiments, the "indication" provided by modified request/response objects 312-314 may be different than one or more set flags.

Figure 4:
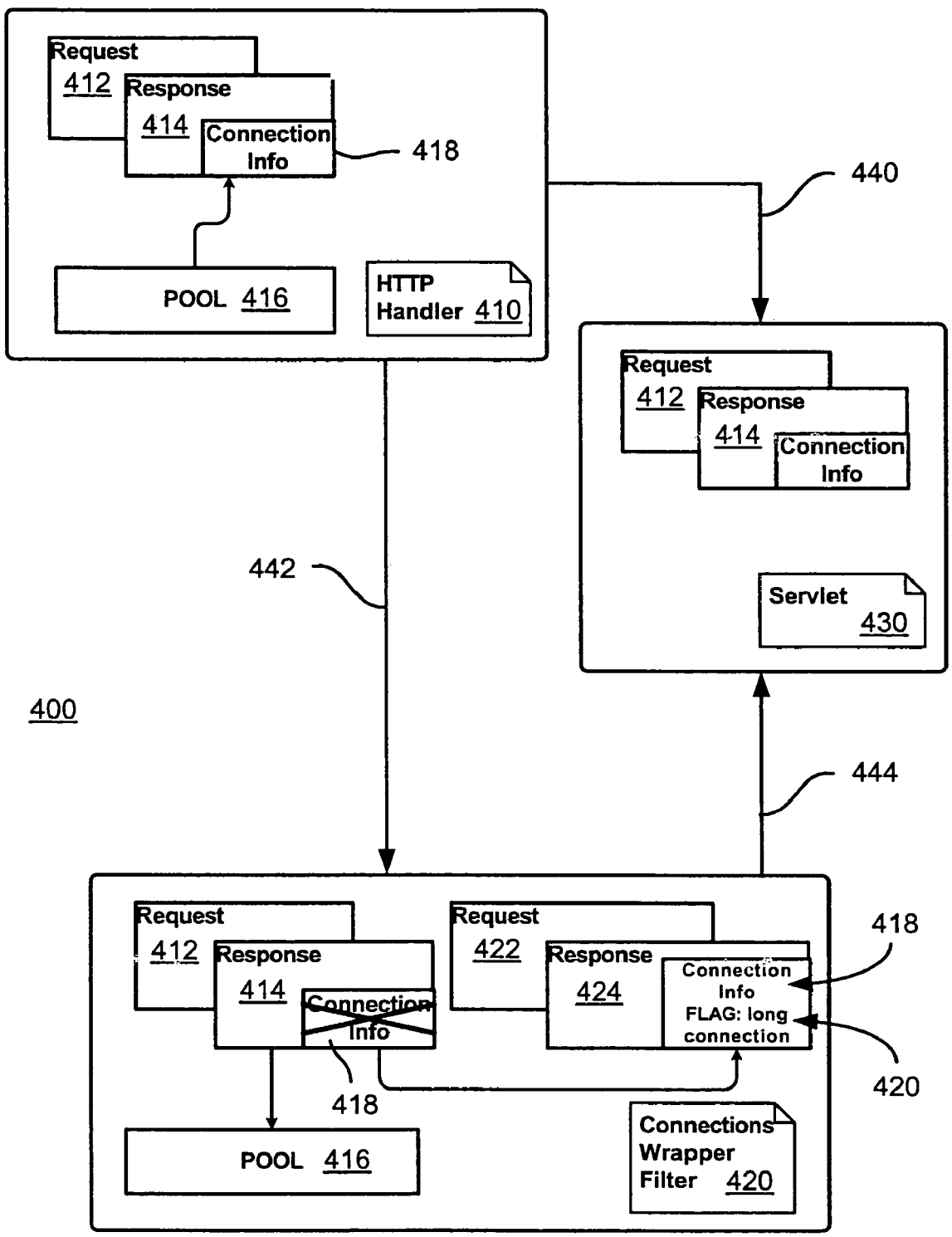
FIG. 4 is a state diagram illustrating selected elements of an embodiment of the invention.

FIG. 4 is a state diagram illustrating selected elements of an embodiment of the invention. In the illustrated embodiment, the communication protocol is the HTTP protocol and the Web component is a servlet. In alternative embodiments, a different communication protocol and/or Web component may be used.

State diagram 400 includes HTTP handler 410, filter 420, and servlet 430. The term "handler" refers to a software routine that performs a particular task. In one embodiment HTTP handler 410 is an implementation of one or more interfaces specified in the HTTP protocol. HTTP handler 410 takes request/response objects 412-414 from object pool 416 and initializes them with connection information 418. The term "connection information" broadly refers to information used to form (and/or manage) a connection in a request/response protocol such as a sender's address, a destination address, a port number, and the like. The term "connection information" also refers to internal connection information such as a dispatcher node identifier, an identifier of the connection on the dispatcher processing the relevant socket, and the like.

In an embodiment, HTTP handler 410 parses request object 412 to determine if filter 420 is mapped to the requested URI (e.g., the URI of servlet 430). If filter 420 is not mapped to the requested URI, then HTTP handler 410 may pass request/response objects 412-414 to servlet 430 as shown by reference numeral 440. If filter 420 is mapped to the requested URI, then HTTP handler 410 may pass request/response objects 412-414 to filter 420 as shown by reference numeral 442.

Filter 420 generates modified request/response objects 422-424 and copies connection information 418 to modified request/response objects 422-424. In an embodiment, at least one of modified request/response objects 422-424 include flag(s) 426. Flag(s) 426 may specify that the connection to the client is to be maintained after the response message is sent to the client. Flag(s) 426 may also specify that modified request/response objects 422-424 are to be maintained (e.g., in memory) after the request message is sent to the client. In an embodiment, filter 420 marks request/response objects 412-414 as "blocked" (e.g., by setting a flag) so that any attempt to send data to the client using request/response objects 412-414 will fail. In one embodiment, filter 420 may delete connection information 418 from request/response objects 412-414. Request/response objects 412-414 may then be returned to pool 416.

In an embodiment, servlet 430 is invoked and filter 420 passes modified request/response objects 422-424 to the servlet as shown by reference numeral 444. Servlet 430 processes modified request/response objects 422-424 to generate a response message. After processing modified request/response objects 422-424, servlet 430 may exit its service method. In an embodiment, modified request/response objects 422-424 are maintained after servlet 430 exits its service method. Similarly, the connection to the client may be maintained after servlet 430 exits its service method.

Figure 5:
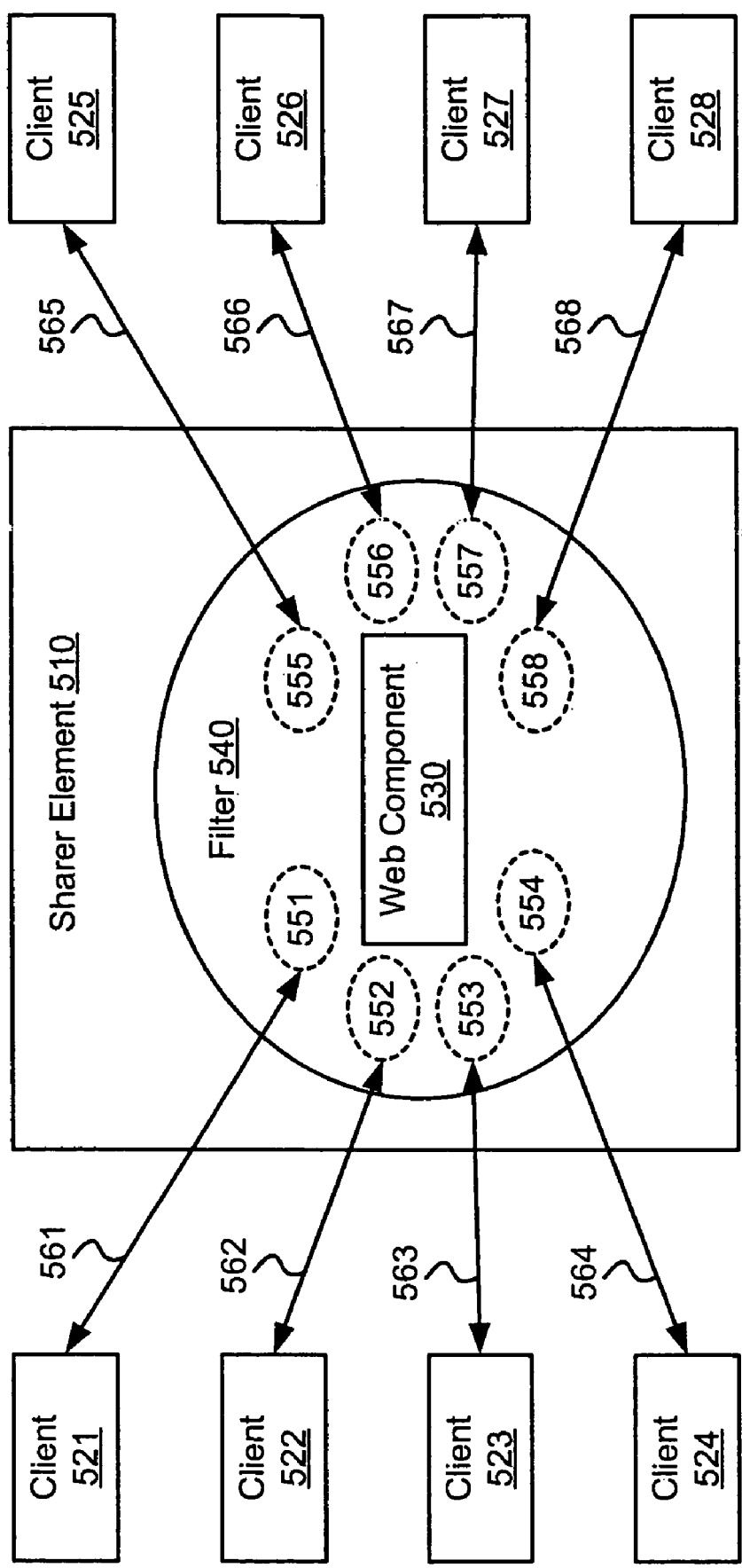
FIG. 5 is a block diagram illustrating selected elements of a Web-based notification system providing a plurality of virtual connections, according to an embodiment of the invention.

FIG. 5 is a block diagram illustrating selected elements of Web-based notification system 500 providing a plurality of virtual connections, according to an embodiment of the invention. The illustrated embodiment of Web-based notification system 500 includes sharer element 510 and clients 521-528. The purpose of sharer element 510 is to periodically send information to a plurality of clients (e.g., clients 521-528).

In one embodiment, each of clients 521-528 "register" with sharer element 510 by sending a request message (e.g., an HTTP request message) having a destination address (e.g., a URI) that maps to Web component 530. Filter 540 may intercept the incoming request message (or corresponding request/response objects) and generate modified request/response objects (e.g., modified request/response objects 551-558) by copying parameters from the request message into the request/response objects. In an embodiment, the modified request/response objects are maintained (e.g., in memory) after the corresponding response message is sent to the client. In an embodiment, Web component 530 is able to process multiple requests in parallel in its service method. A limitation occurs, however, when a Web container (e.g., Web container 300, shown in FIG. 3) is not able to pass more connections to any Web component because all application threads are in use. Web component 530 exits its service method and releases the application thread without closing the connection to the client. Since the application thread is released, the server can accept and process new request messages.

After the initial access, connections 561-568 may be maintained. Maintaining the connection broadly refers to maintaining an input stream, maintaining an output stream, maintaining an input socket, and/or maintaining an output socket.

Sharer element 510 may periodically use modified request/response objects 551-558 to send information to clients 521-528 through connections 561-568. For example, if data is updated after Web component 530 has processed an initial request message, an updated response message may be sent to one or more of clients 521-528. Similarly, Web component 530 may provide new data to clients 521-528 as it becomes available. Examples of environments in which Web-based notification system 500 may be used include chat systems, messaging systems, file sharing systems, and the like.

In an embodiment of the invention, Web component 530 is a servlet. The term "servlet" broadly refers to server-side software that extends the functionality of an application server. In one embodiment, the servlet is implemented in accordance with one of the servlet specifications such as, Java Specification Request (JSR) 000053 Servlet 2.3 Specification promulgated by the Java Community Process (hereinafter, the servlet specification). The servlet specification describes a filter Application Programming Interface (API) for intercepting a servlet's invocation. In one embodiment, filter 540 is based, at least in part, on the filter API of the servlet specification.

Turning now to FIGS. 6-9, the particular methods associated with embodiments of the invention are described in terms of computer software and hardware with reference to a flowchart. The methods to be performed by a computing device (e.g., an application server) may constitute state machines or computer programs made up of computer-executable instructions. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement the teachings of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

Figure 6:
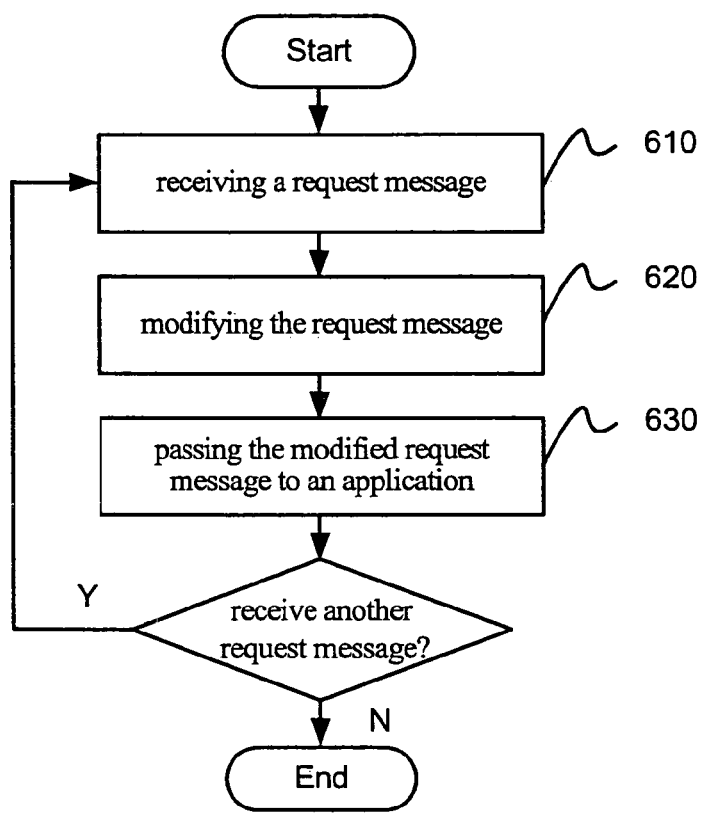
FIG. 6 is a flow diagram illustrating certain aspects of a method for managing a connection, according to an embodiment of the invention.

FIG. 6 is a flow diagram illustrating certain aspects of a method for managing a connection, according to an embodiment of the invention. Referring to process block 610, a server-side component (e.g., filter 310, shown in FIG. 3) receives a client request message having one or more parameters. In an embodiment, the received request message is an HTTP request message. The term "HTTP request message" broadly refers to a request message implemented in accordance with one of the HTTP protocols. The parameters contained in the received message may include an address (e.g., a URI) specifying an application to process the request message or a requested resource.

Referring to process block 620, the server-side component (e.g., filter 310, shown in FIG. 3) modifies the request message. In an embodiment, the request message is modified to indicate that a connection to the client is to remain open after a corresponding response message is sent. In one embodiment, the connection is a Transmission Control Protocol/Internet Protocol (TCP/IP) connection. The term "modifying" the request message broadly refers to generating a copy of the request message, setting data in the request message (e.g., a flag or a value of a setting), adding data to the message, removing data from the message, and the like.

In one embodiment, the server-side component is a Java servlet. In such an embodiment, receiving a request message may include receiving request/response objects from, for example, a Web container (such as Web container 300, shown in FIG. 3). The term "modifying" the request message may refer to generating modified copies of the request/response objects. In one embodiment, the modified request/response objects have one or more flags set to indicate that the connection to the client is to remain open after the response message is sent to the client.

Similarly, the modified request/response objects may have one or more flags set to indicate that the modified request/response objects are to be maintained after the response message is sent. In one embodiment, the modified request/response objects are maintained in volatile memory. In an alternative embodiment, the modified request/response objects may be maintained in a persistent store.

Referring to process block 630, the modified request message is passed to an application for processing. In on embodiment, the application is a Web application. In such an embodiment modified request/response objects may be passed to a Web component. The term Web component broadly refers to a servlet, a JSP, a portlet, and the like. In an embodiment in which the connection is an HTTP connection, passing the modified request message may include passing a modified HTTP request object and/or a modified HTTP response object to the Web component of the Web application.

Figure 7:
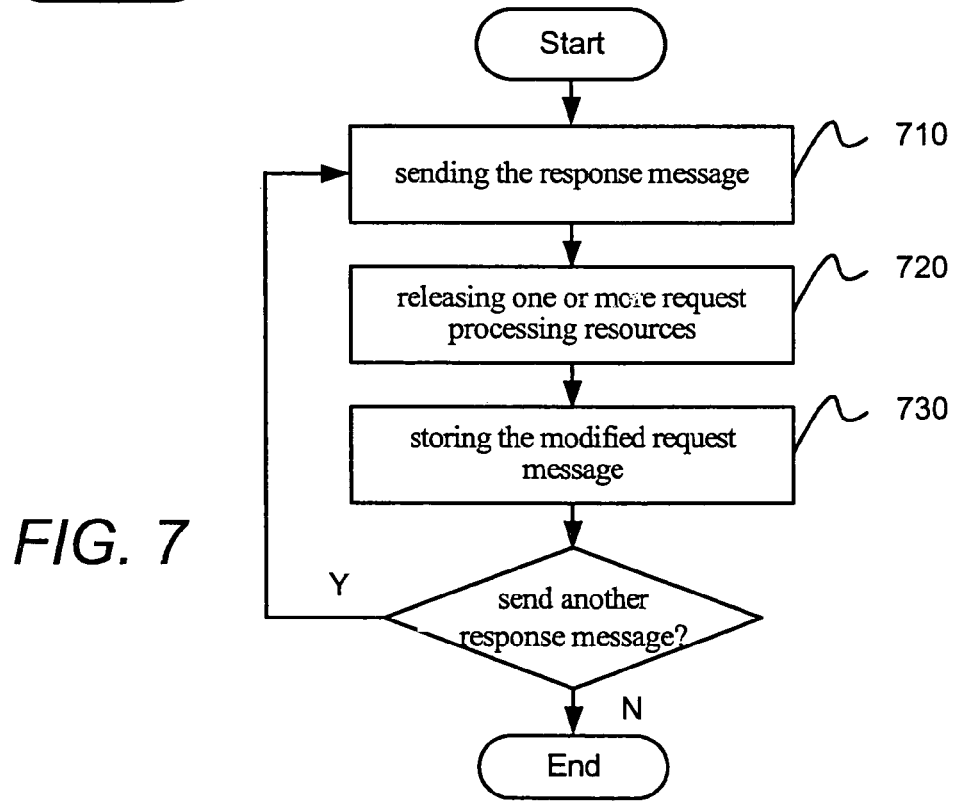
FIG. 7 is a flow diagram illustrating certain aspects of a method for managing a connection, according to an embodiment of the invention.

FIG. 7 is a flow diagram illustrating certain aspects of a method for managing a connection, according to an embodiment of the invention. Referring to process block 710, the response message is sent to the client. In an embodiment, the response message is an HTTP response message. In conventional systems, the HTTP protocol (as well as the J2EE specification) specifies that the connection to the client should be closed after the response message is sent. In contrast to conventional systems, in embodiments of the invention, the connection to the client is maintained subsequent to sending the response message. Maintaining the connection broadly refers to maintaining an input stream, maintaining an output stream, maintaining an input socket, and/or maintaining an output socket.

Referring to process block 720, one or more request processing resources are released responsive to sending the response message to the client. The term "request processing resources" broadly refers to releasing an application thread (e.g., a thread of Web component 310, shown in FIG. 3) and/or releasing memory resources associated with processing the request message.

Referring to process block 730, the modified request message is stored in memory. The term "stored in memory" broadly refers to storing the modified request message in volatile and/or persistent memory. In one embodiment, storing the modified request message may include storing the modified request/response objects in memory. In an embodiment, the system (e.g., application server 230, shown in FIG. 2) may maintain information about the modified request message such as its location in memory and/or the application that stored the message.

Figure 8:
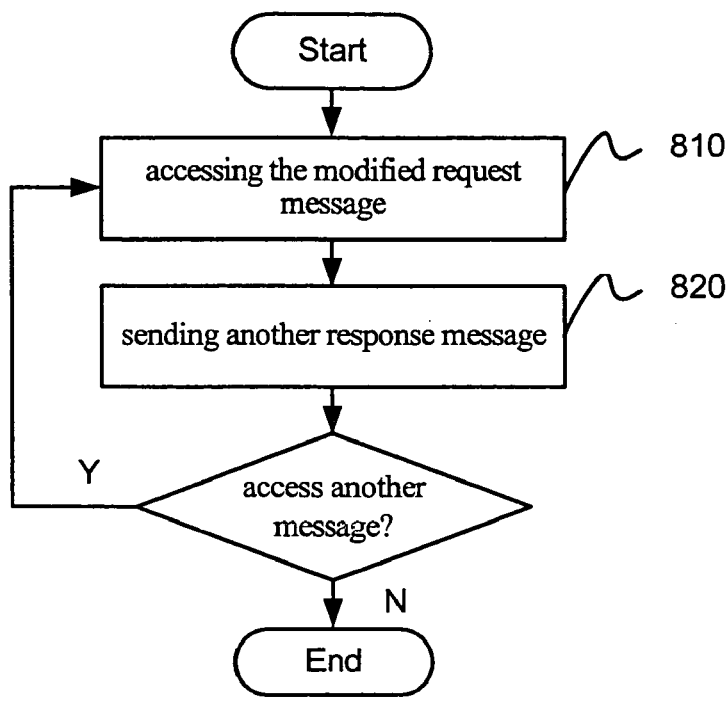
FIG. 8 is a flow diagram illustrating certain aspects of a method for managing a connection, according to an embodiment of the invention.

FIG. 8 is a flow diagram illustrating certain aspects of a method for managing a connection, according to an embodiment of the invention. Referring to process block 810, an application (e.g., Web component 530, shown in FIG. 5) accesses the modified request message to, for example, identify a client that sent a request message. The term "accessing" refers to, for example, reading information from memory. In one embodiment, the client may be identified from information in the request message such as the sender's Internet Protocol address. The term Internet Protocol broadly refers to any of the Internet Protocols such as the protocol described in Request For Comments (RFC) 791, entitled, "Internet Protocol." Referring to process block 820, the application (e.g., Web component 530, shown in FIG. 5) sends another response message to the client based, at least in part, on the information (such as client's IP address) contained modified request message.

Figure 9:
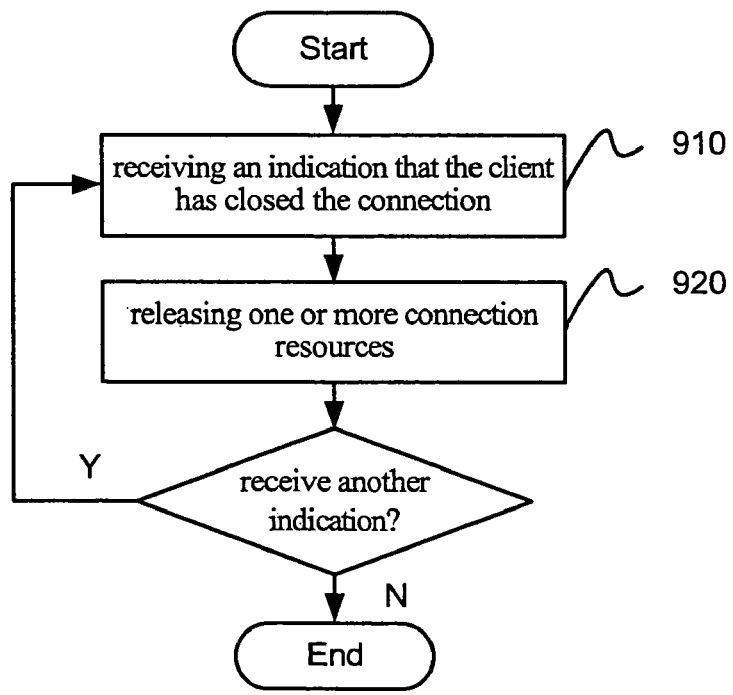
FIG. 9 is a flow diagram illustrating certain aspects of a method for managing a connection, according to an embodiment of the invention.

FIG. 9 is a flow diagram illustrating certain aspects of a method for managing a connection, according to an embodiment of the invention. Referring to process block 910, an application (e.g., Web component 530, shown in FIG. 5) receives an indication that the client has closed the connection with the application server. The term "receiving an indication" may refer to receiving an exception responsive to writing to an output stream of the connection to the client and/or receiving an exception responsive to reading from an input stream of the connection to the client.

In one embodiment, "receiving an indication" may include receiving a closed client notification from an event listener. An "event listener" is a software entity that monitors, for example, various life-cycle events such as application context initialization, session creation, connection closure, and the like. In one embodiment, the event listener may be an implementation, at least in part, of one of the listener interfaces described in the servlet specification. The event listener may be declared, for example, in the deployment descriptor of the application. Listing 3 is an example of a tag for declaring the event listener.

Listing 3

```
<listener>
    <listener-class >ClientLostListener</ listener-class >
</ listener >
```

In an embodiment, the event listener includes a method to pass the modified request/response objects to the application so that the application knows which client has closed the connection. For example, in one embodiment, the event listener includes the following method:

public void connectionClosed (ServletRequest
request, ServletResponse response).

Figure 10:
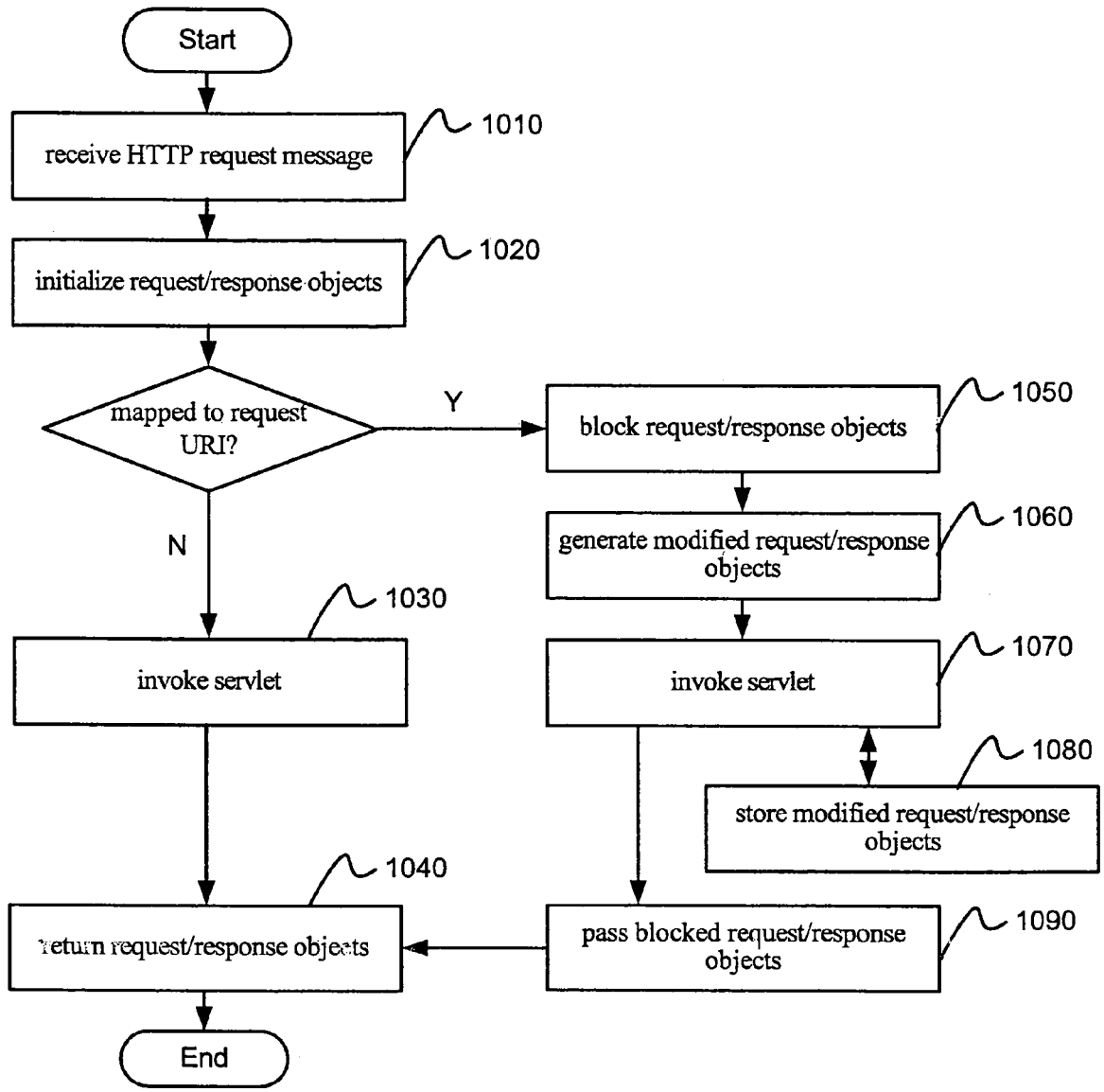
FIG. 10 is a flow diagram illustrating certain aspects of a method for managing a HyperText Transfer Protocol (HTTP) connection, according to an embodiment of the invention.

In an embodiment, the communication protocol used by a client and a server is the HTTP protocol. In such an embodiment the servlet may receive an HTTP request message from the client. FIG. 10 is a flow diagram illustrating certain aspects of a method for managing a HyperText Transfer Protocol (HTTP) connection, according to an embodiment of the invention.

Referring to process block 1010, an application server (or an element of an application server) receives an HTTP request message from the client. In one embodiment, an HTTP handler initializes a pair of request/response objects with client connection data obtained from the HTTP request message. The HTTP handler may then determine whether a filter (e.g., filter 420, shown in FIG. 4) is mapped to the requested URI. If the filter is not mapped to the requested URI, then the HTTP handler may invoke a servlet (e.g., servlet 430, shown in FIG. 4) at 1030. The servlet may process the request/response objects and them return them to the object pool (e.g., object pool 330, shown in FIG. 3) at 1040.

If the filter is mapped to the requested URI, then the HTTP handler may pass the request/response objects to the filter at 1050. In an embodiment, the filter marks the request/response objects as "blocked" so that any attempt to send data to the client using them will be blocked. The filter may generate modified request/response objects (e.g., modified request/response objects 422-424, shown in FIG. 4), for example, by copying client connection data from the initialized request/response objects to the modified request/response objects at 1060.

In an embodiment, the servlet is invoked at process block 1070 and the modified request/response objects are passed to the servlet. In one embodiment, the servlet stores the modified request/response objects in memory as shown by reference numeral 1080. The servlet may access the modified request/response objects to, for example, periodically contact the client(s). The blocked request/response objects may be returned to the object pool as shown by reference numeral 1090.

Elements of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method comprising:
receiving from a client, via a connection between the client and a server computer, a request message to exit a service provided by the server and to close the connection to the client;

modifying the request message to indicate that the connection to the client is to remain open after a corresponding response message is sent;

passing the modified request message to an application on the server for processing;

after processing the modified request message, sending the corresponding response message to the client via the connection, wherein the connection to the client is maintained subsequent to sending the response message; and releasing one or more request processing resources responsive to sending the response message to the client, including releasing an application thread associated with the service to enable the application to process another request message from the client, and releasing memory resources associated with processing the request message.

2. The method of claim 1, wherein receiving the request message comprises:

receiving a HyperText Transfer Protocol (HTTP) request from the client.

3. The method of claim 2, wherein modifying the request message comprises:

generating an HTTP request object indicating that the HTTP request object is to be maintained after the response message is sent to the client; and generating an HTTP response object indicating that the HTTP response object is to be maintained after the response message is sent to the client.

4. The method of claim 3, wherein passing the modified request message to the application for processing comprises:

passing the HTTP request object to the application; and
passing the HTTP response object to the application.

5. The method of claim 1, further comprising
storing the modified request message in memory.

6. The method of claim 5, further comprising:
accessing the modified request message to identify the client; and sending another response message to the client based, at least in part, on the modified request message.

7. The method of claim 6, further comprising:
receiving an indication that the client has closed the connection; and releasing one or more connection resources, responsive to receiving the indication that the client has closed the connection.

8. The method of claim 7, wherein receiving the indication that the client has closed the connection comprises at least one of:

receiving an exception responsive to writing to an output stream of the connection to the client;

receiving an exception responsive to reading from an input stream of the connection to the client; and receiving a closed client connection notification from an event listener.

9. The method of claim 8, wherein releasing one or more connection resources comprises at least one of:

closing an input stream of the connection;
closing an output stream of the connection; and
releasing memory resources associated with processing the request message.

10. The method of claim 1, wherein the application is a Web application.

11. The method of claim 10, wherein the Web application includes at least one of:

a servlet;
a Java Server Page; and
a portlet.

12. A system comprising:
a client; and
a server computer for coupling to the client, the server computer to include a communication service to receive a request message from the client via a connection between the client and the server computer to exit the communication service and to close the connection to the client, the communication service to further provide a request object based, at least in part, on the received request message, a filter to receive the request object from the communication service and to generate a modified request object based, at least in part, on the received request object, wherein the modified request object is to indicate that the connection to the client is to be maintained subsequent to sending a corresponding response message, and one or more request processing resources responsive to sending the response message to the client are to be released, and an application to receive and process the modified request object, and to generate the corresponding response message based, at least in part, on the modified request object after processing the modified request object, wherein the one or more request processing resources responsive to sending the response message to the client include an application thread associated with the communication service, and memory resources associated with processing the modified request message.

13. The system of claim 12, wherein
the communication service is a HyperText Transfer Protocol (HTTP) service;

the received request message is an HTTP request message;
the request object is an HTTP request object; and
the modified request object is a modified HTTP request object.

14. The system of claim 12, wherein the modified request object further indicates that the modified request object is to be maintained subsequent to sending the response message to the client.

15. The system of claim 14, wherein the modified request object is to be stored in memory.

16. The system of claim 15, wherein the application is to generate another response message based, at least in part, on the modified request object.

17. The system of claim 12, the server to further include an event listener to notify the application if the client closes the connection.

18. An article of manufacture comprising a computer-readable storage medium having instructions stored thereon to cause a processor to perform operations including:

receiving from a client, via a connection between the client and a server computer, a request message to exit a service provide by the server and to close the connection to the client;

modifying the request message to indicate that the connection to the client is to remain open after a corresponding response message is sent;

passing the modified request message to an application on the server for processing;

after processing the modified request message, sending the corresponding response message to the client via the connection, wherein the connection to the client is maintained subsequent to sending the response message; and releasing one or more request processing resources responsive to sending the response message to the client, including releasing an application thread associated with the service to enable the application to process another request message, from the client, and releasing memory resources associated with processing the request message.

19. The article of manufacture of claim 18, wherein receiving the request message further includes:

receiving a HyperText Transfer Protocol (HTTP) request from the client.

20. The article of manufacture of claim 19, wherein modifying the request message further includes:

generating an HTTP request object indicating that the HTTP request object is to be maintained after the response message is sent to the client; and generating an HTTP response object indicating that the HTTP response object is to be maintained after the response message is sent to the client.

21. The article of manufacture of claim 18, further including storing the modified request message in memory.

22. The article of manufacture of claim 21, further including accessing the modified request message to identify the client; and sending another response message to the client based, at least in part, on the modified request message.

23. The article of manufacture of claim 22, further including receiving an indication that the client has closed the connection; and releasing one or more connection resources, response to receiving the indication that the client has closed the connection.

* * * * *

UNITED STATES PATENT AND TRADEMARK OFFICE
CERTIFICATE OF CORRECTION

| | |
|---|---|
| PATENT NO. | : 7,571,236 B2 |
| APPLICATION NO. | : 10/863020 |
| DATED | : August 4, 2009 |
| INVENTOR(S) | : Maria Jurova |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1458 days.

Signed and Sealed this

Seventh Day of September, 2010

David J. Kappos
*Director of the United States Patent and Trademark Office*